United States Patent
Hapsari et al.

(10) Patent No.: US 10,764,956 B2
(45) Date of Patent: Sep. 1, 2020

(54) USER EQUIPMENT AND COMMUNICATION METHOD

(71) Applicant: NTT DOCOMO, INC., Tokyo (JP)

(72) Inventors: Wuri Andarmawanti Hapsari, Tokyo (JP); Tooru Uchino, Tokyo (JP); Hideaki Takahashi, Tokyo (JP); Anil Umesh, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/091,477

(22) PCT Filed: Apr. 6, 2017

(86) PCT No.: PCT/JP2017/014315
§ 371 (c)(1),
(2) Date: Oct. 4, 2018

(87) PCT Pub. No.: WO2017/175816
PCT Pub. Date: Oct. 12, 2017

(65) Prior Publication Data
US 2019/0116629 A1    Apr. 18, 2019

(30) Foreign Application Priority Data
Apr. 8, 2016  (JP) ................................. 2016-078504

(51) Int. Cl.
*H04W 76/27*  (2018.01)
*H04L 5/00*   (2006.01)
(Continued)

(52) U.S. Cl.
CPC ............ *H04W 76/27* (2018.02); *H04L 5/001* (2013.01); *H04L 5/0035* (2013.01);
(Continued)

(58) Field of Classification Search
CPC ........................... H04B 7/0413; H04B 7/0482
See application file for complete search history.

(56) References Cited

U.S. PATENT DOCUMENTS

2015/0124748 A1* 5/2015 Park ..................... H04L 5/0032
370/329

FOREIGN PATENT DOCUMENTS

| EP | 3065484 A1 | 9/2016 |
| WO | 2015/063963 A1 | 5/2015 |
| WO | 2015/065129 A1 | 5/2015 |

OTHER PUBLICATIONS

Extended European Search Report issued in counterpart European Patent Application No. 17779194A, dated Oct. 9, 2019 (7 pages).
(Continued)

*Primary Examiner* — Chandrahas B Patel
(74) *Attorney, Agent, or Firm* — Osha Liang LLP

(57) ABSTRACT

There is provided user equipment for communicating with a first base station and a second base station, the user equipment including a receiver that receives, form the first base station or the second base station with which an RRC connection is established, a first message indicating to establish a split bearer between the first base station and the second base station; and a communicator that establishes the split bearer between the first base station and the second base station that are reported by the first message, wherein, in the split bearer, a process of a PDCP layer is performed by one of the first base station and the second base station.

4 Claims, 13 Drawing Sheets

| SINGLE CONNECTIVITY | | DUAL CONNECTIVITY | | CHANGE PATTERN |
|---|---|---|---|---|
| RRC | PDCP | RRC | Anchor PDCP | |
| LTE | | LTE | NR | 1 |
| LTE | | NR | NR | 2 |
| NR | | NR | NR | 3 |
| NR | | LTE | NR | 4 |
| NR | | NR | LTE | 5 |
| NR | | LTE | LTE | 6 |

(51) Int. Cl.
    *H04W 76/15*     (2018.01)
    *H04W 28/06*     (2009.01)
    *H04W 92/20*     (2009.01)

(52) U.S. Cl.
    CPC .......... *H04W 28/06* (2013.01); *H04W 76/15* (2018.02); *H04W 92/20* (2013.01)

(56) References Cited

OTHER PUBLICATIONS

International Search Report issued in PCT/JP2017/014315 dated Jun. 27, 2017 (2 pages).
Written Opinion of the International Searching Authority issued in PCT/JP2017/014315 dated Jun. 27, 2017 (4 pages).
LG Electronics Inc.; "Text Proposal for Optimized inter-MeNB handover"; 3GPP TSG-RAN WG3 Meeting #88, R3-150934; Fukuoka, Japan; May 25-29, 2015 (6 pages).
3GPP TS 36.300 V13.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Dec. 2015 (290 pages).
Office Action issued in the counterpart Japanese Patent Application No. 2018-510651, dated Feb. 4, 2020 (8 pages).
LG Electronics Inc.; "New RB configurations in 5G"; 3GPP TSG-RAN WG2 Meeting #93bis R2-162862; Dubrovnik, Croatia, Apr. 11-15, 2016 (2 pages).
Office Action issued in the counterpart Japanese Patent Application No. 2018-510651, dated Apr. 28, 2020 (5 pages).

\* cited by examiner

FIG.7

| SINGLE CONNECTIVITY | | DUAL CONNECTIVITY | | CHANGE PATTERN |
|---|---|---|---|---|
| RRC | PDCP | RRC | Anchor PDCP | |
| LTE | LTE | LTE | NR | 1 |
| LTE | LTE | NR | NR | 2 |
| NR | NR | NR | NR | 3 |
| NR | NR | LTE | NR | 4 |
| NR | NR | NR | LTE | 5 |
| NR | NR | LTE | LTE | 6 |

# USER EQUIPMENT AND COMMUNICATION METHOD

TECHNICAL FIELD

The present invention relates to user equipment and a communication method.

BACKGROUND ART

A Long Term Evolution (LTE) system adopts carrier aggregation (CA) that uses a predetermined bandwidth (a maximum of 20 MHz) as a basic unit and performs communication using a plurality of carriers at the same time.

When CA is performed, a primary cell (PCell) that has high reliability and secures connectivity and a secondary cell (SCell) which is a subsidiary cell are configured in user equipment. SCell is a cell that is added to PCell and is configured in the user equipment. The addition and deletion of SCell are performed by radio resource control (RRC) signaling. SCell is in a deactivate state immediately after it is configured in the user equipment. Therefore, SCell is activated into a communicable (schedulable) cell. As illustrated in FIG. 1, in CA of LTE Rel-10, a plurality of CCs are used under the control of the same base station.

In contrast, in Rel-12, dual connectivity has been proposed which performs simultaneous communication using CCs under the control of different base stations to achieve high throughput. That is, in the dual connectivity, user equipment performs communication, using the radio resources of two physically different base stations at the same time.

The dual connectivity is a kind of CA and is also called inter-base station carrier aggregation (Inter eNB CA). Master-eNB (MeNB) and Secondary-eNB (SeNB) are introduced. FIG. 2 illustrates an example of the dual connectivity. In the example illustrated in FIG. 2, MeNB communicates with the user equipment, using CC #1, and SeNB communicates with the user equipment, using CC #2. In this way, dual connectivity (hereinafter, referred to as DC) is achieved.

In DC, a bearer that is called a split bearer, namely, a logical packet path including branched paths, is defined. In the split bearer, MeNB performs the process of a packet data control protocol (PDCP) layer and both MeNB and SeNB perform the processes of a radio link control (RLC) layer, a media access control (MAC) layer, and a physical (PHY) layer. The use of the split bearer makes it possible to distribute the processing load on a base station and to enhance the throughput of data transmitted to user equipment UE.

PRIOR ART DOCUMENT

Non-Patent Document

Non-Patent Document 1: 3GPP TS 36.300 V13.2.0 (2015-12)

SUMMARY OF THE INVENTION

Problem to be Solved by the Invention

Currently, in 3rd Generation Partnership Project (3GPP), a fifth-generation wireless technology has been studied in order to further increase system capacity and a data transmission rate, to further reduce latency in a wireless section, to achieve the simultaneous connection of a large number of terminals, and to reduce the cost and power consumption of a terminal. In 5G, it is highly likely that that a radio technique different from that of LTE will be used. Accordingly, in 3GPP, the wireless network that supports 5G is called a new radio access network (New RAT) and is distinguished from a wireless network that supports LTE.

In the initial stage of 5G (5G specifications scheduled to be defined in 2020), a connection configuration which is called an LTE assisted NR connection, mainly uses LTE in a macro cell to ensure the coverage of the C-plane and transmits and receives the U-plane using LTE and New RAT (NR) has been discussed.

FIG. 3 is a diagram illustrating the concept of the LTE assisted NR connection. In FIG. 3, an "NR node" means a base station that supports 5G. As illustrated in FIG. 3, in the LTE assisted NR connection, it has been studied to process data transmitted from a core network using a PDCP layer of one of a LTE base station and a NR node, and to transmit it to user equipment using both the LTE base station and the NR node. That is, the LTE assisted NR connection can be regarded as a communication method using a split bearer, as in the above-mentioned DC.

In addition, in 3GPP, a configuration that is not limited to the LTE assisted NR connection and independently operates a 5G wireless network has been discussed. In this case, data transmitted from a core network is transmitted to user equipment through a PDCP layer of an NR node. In the initial stage of 5G, an LTE wireless network is also present. When communication is performed by the LTE wireless network, the data transmitted from the core network is transmitted to the user equipment through a PDCP layer of an LTE base station.

Taking these conditions into account, it can be considered that a scheme is required that voluntarily control as to whether a process of the PDCP layer is to be performed by the LTE base station or the NR node, for performing communication using a split bearer for the LTE assisted NR connection. However, no scheme is defined in 3GPP for voluntarily controlling as to whether the process of the PDCP layer is to be performed by the LTE base station or the NR node.

The disclosed technique has been developed in view of the above-mentioned problems, and an object is to provide a technique that can voluntarily change a base station which performs a process of a PDCP layer when communication is performed using a split bearer.

Means for Solving the Problem

According to an aspect of the present invention, there is provided user equipment for communicating with a first base station and a second base station, the user equipment including a receiver that receives, form the first base station or the second base station with which an RRC connection is established, a first message indicating to establish a split bearer between the first base station and the second base station; and a communicator that establishes the split bearer between the first base station and the second base station that are reported by the first message, wherein, in the split bearer, a process of a PDCP layer is performed by one of the first base station and the second base station.

Advantage of the Invention

According to the disclosed technology, a technique is provided that can voluntarily change a base station which performs a process of a PDCP layer when communication is performed using a split bearer.

BRIEF DESCRIPTION OF DRAWINGS

FIG. 7 is a diagram illustrating a change pattern of a communication method performed by the radio communication system;

EMBODIMENTS OF THE INVENTION

Hereinafter, an embodiment of the invention is described with reference to the drawings. The following embodiment is illustrative and embodiments to which the invention is applied are not limited to the following embodiment. For example, it is assumed that a radio communication system according to this embodiment is a system based on LTE (including 5G). However, the invention is not limited to LTE (including 5G) and can be applied to other communication systems. In the specification and the claims, "LTE" is used in a broad meaning including, not only a communication scheme corresponding to Release 8 or 9 of 3GPP, but also Releases 10, 11, 12, or 13 of 3GPP, or the fifth generation communication scheme corresponding to on and after Release 14.

<Split Bearer>

Figure 1:
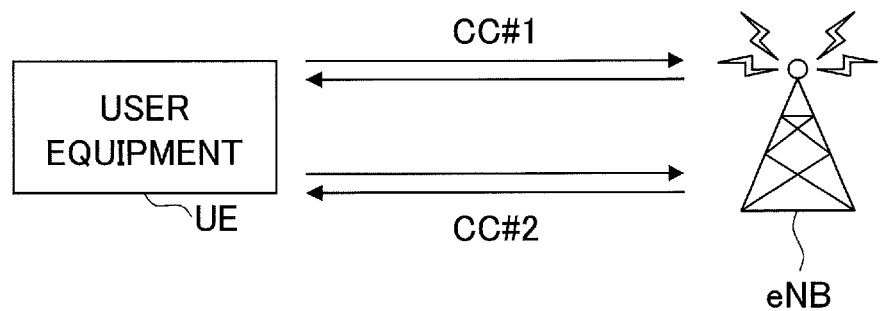
FIG. 1 is a diagram illustrating CA in LTE Rel-10.
Figure 2:
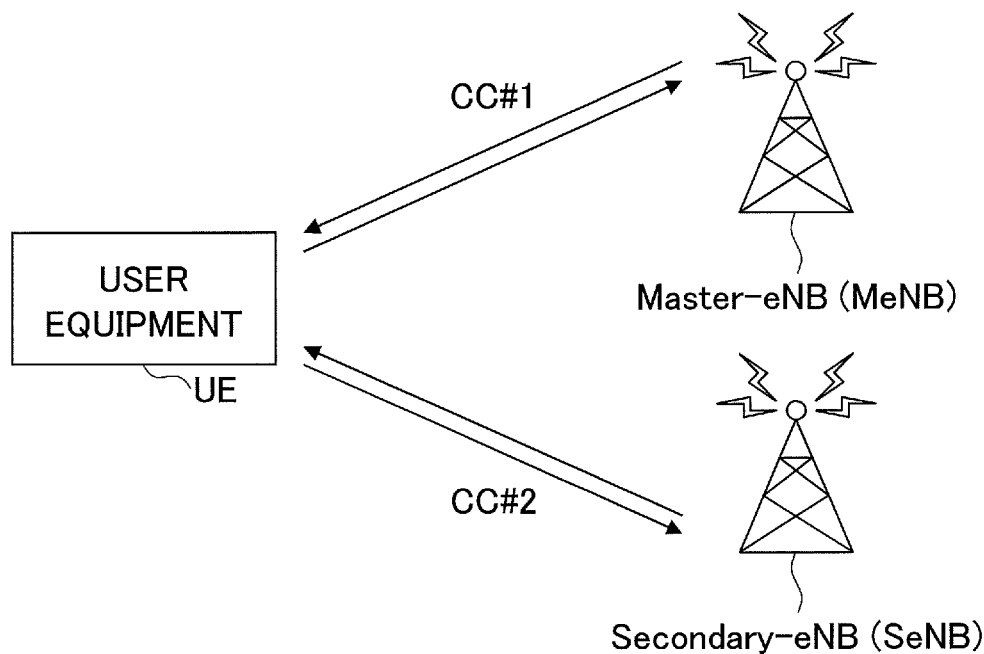
FIG. 2 is a diagram illustrating an example of DC introduced to Rel-12.
Figure 3:
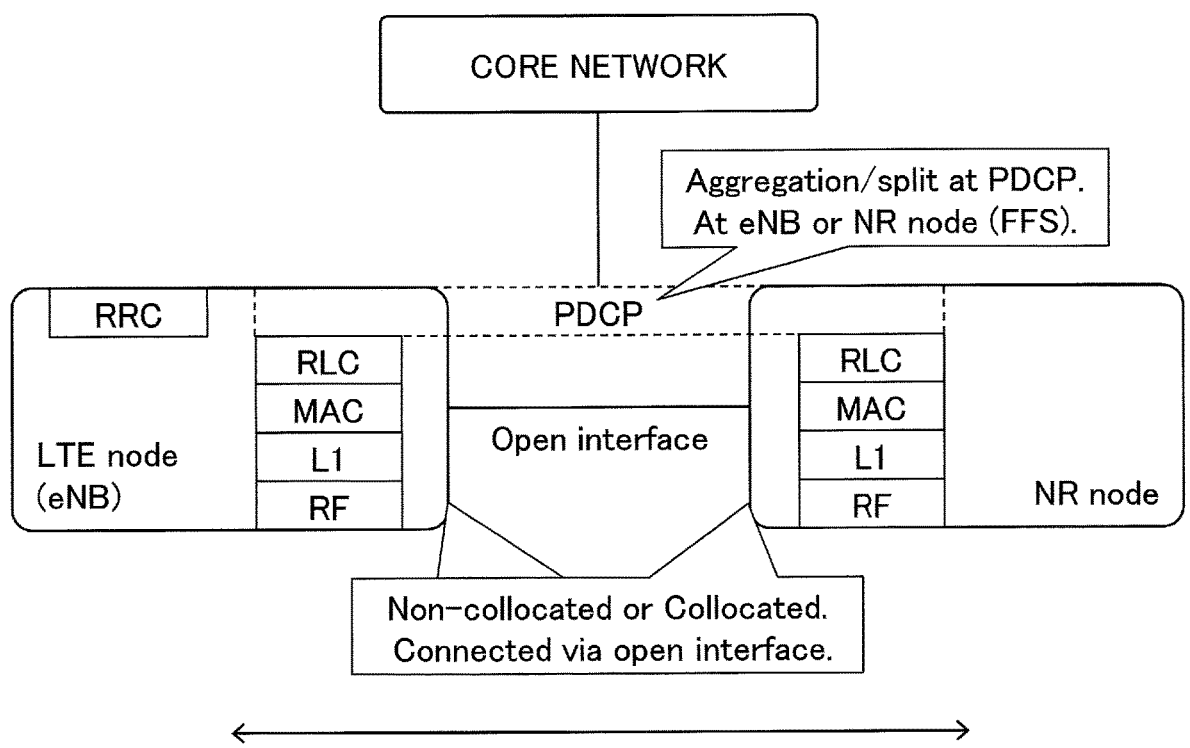
FIG. 3 is a diagram illustrating the concept of an LTE assisted NR connection.
Figure 4A:
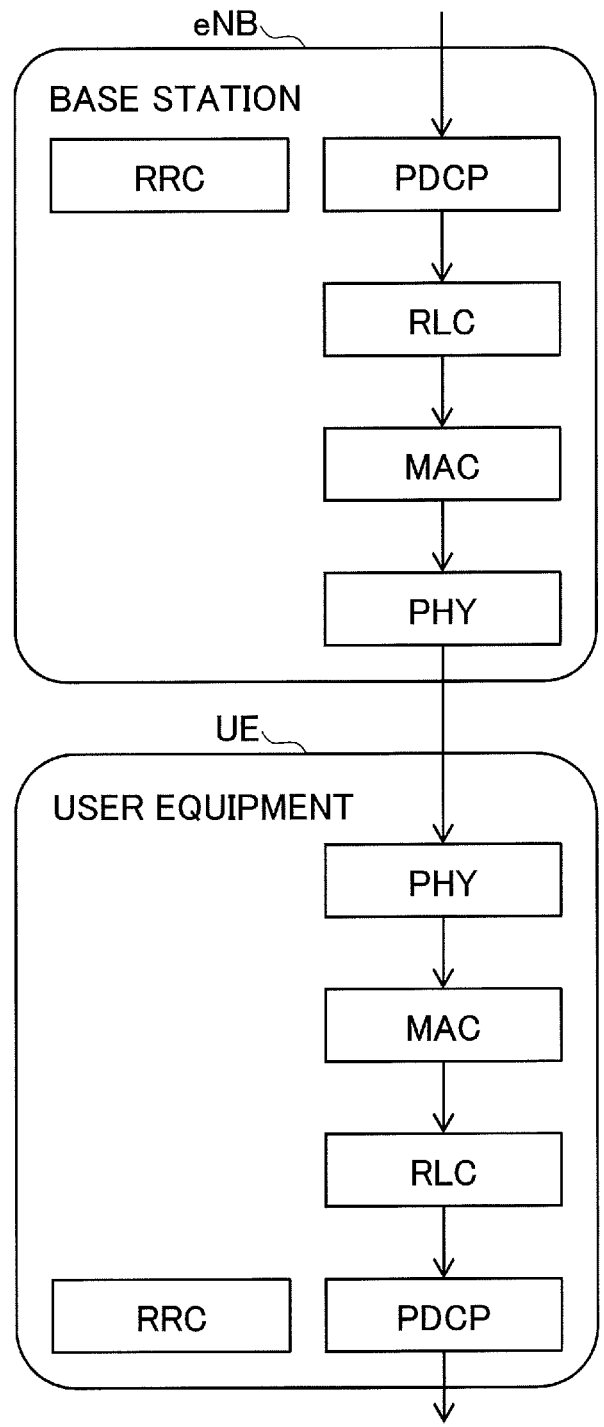
FIG. 4A is a diagram illustrating a protocol stack in LTE.
Figure 4B:
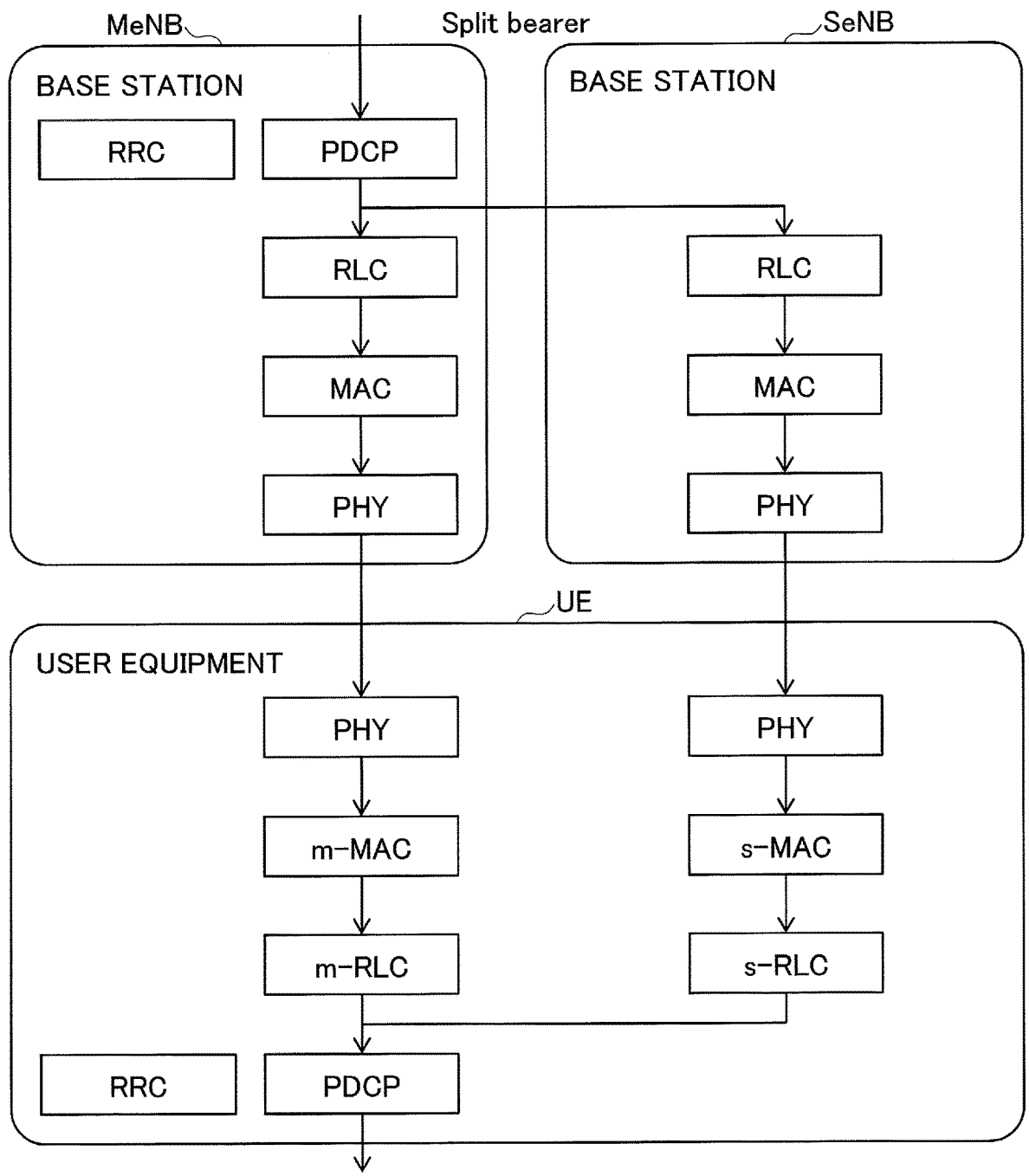
FIG. 4B is a diagram illustrating a protocol stack in LTE.

FIG. 4 is a diagram illustrating a protocol stack in LTE. FIG. 4A illustrates a protocol stack in a general bearer defined by Rel-8 of LTE, i.e., a logical packet path; and FIG. 4B illustrates a split bearer, i.e., a logical packet path including branched paths, and a corresponding protocol stack. As illustrated in FIG. 4B, data that is transmitted from a core network is processed by a PDCP layer in MeNB and is routed to an RLC layer in MeNB and an RLC layer in SeNB. In addition, a PDCP layer in user equipment UE reorders data received from RLC (m-RLC) corresponding to MeNB and data received from RLC (s-RLC) corresponding to SeNB. In the split bearer, the process of the RRC layer is performed in MeNB. That is, in the split bearer in LTE, a base station that performs the process of the RRC layer and a base station that performs the process of the PDCP layer are fixed to MeNB.

<System Configuration>

Figure 5:
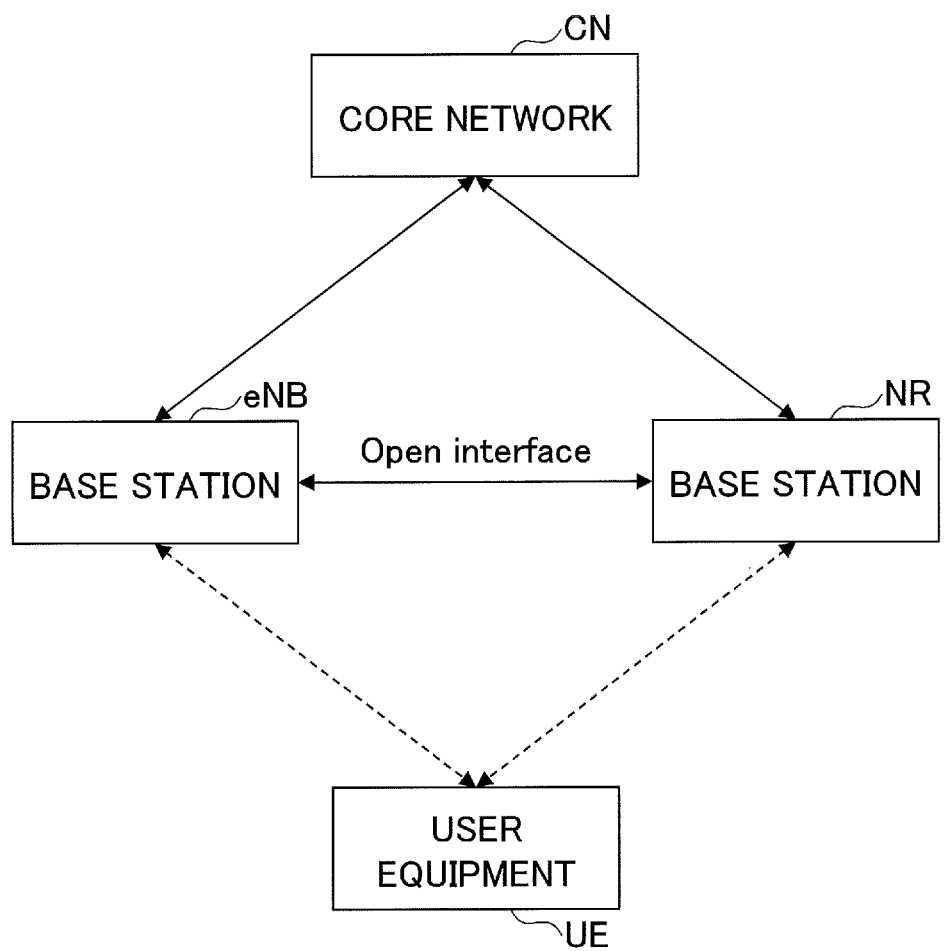
FIG. 5 is a diagram illustrating an example of a configuration of a radio communication system according to an embodiment.

FIG. 5 is a diagram illustrating an example of a configuration of a radio communication system according to an embodiment. As illustrated in FIG. 5, the radio communication system according to this embodiment includes a core network CN, a base station eNB that supports LTE, a base station NR that supports 5G New RAT (NR), and user equipment UE. The base station eNB and the base station NR can communicate with each other, using a predetermined interface (which is represented by Open interface in FIG. 5). The predetermined interface is an interface corresponding to "X2" in LTE. In the example illustrated in FIG. 5, one base station eNB, one base station NR, and one user equipment UE are illustrated. However, the radio communication system may include a plurality of base stations eNB and a plurality of base stations NR or may include a plurality of units of user equipment UEs.

Cases are included such that the base station eNB and the base station NR of the radio communication system are physically independent (Non-Collocated), and the base station eNB and the base station NR of the radio communication system are logically independent within a single physical device (Collocated).

<Outline of Operation>

Figure 6A:
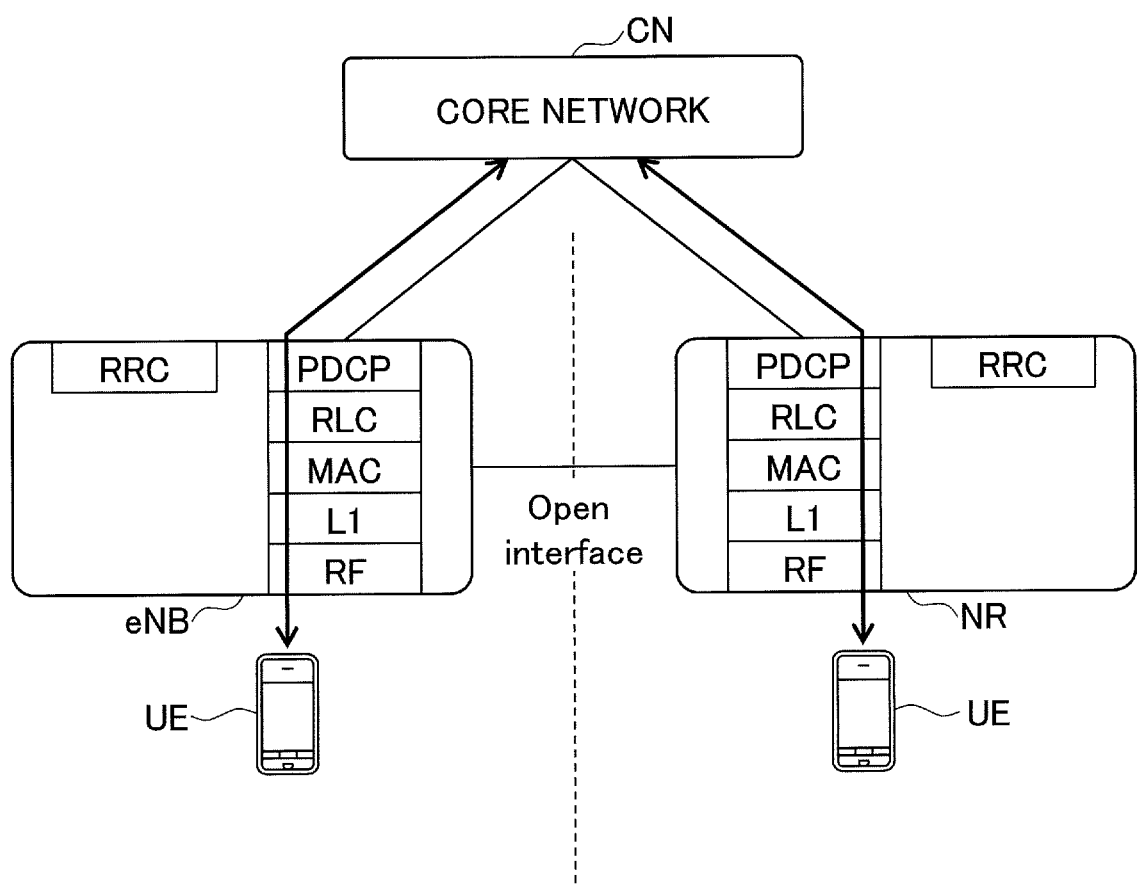
FIG. 6A is a diagram illustrating an outline of the operation of the radio communication system according to the embodiment.

FIG. 6 is a diagram illustrating the outline of the operation of the radio communication system according to the embodiment. FIG. 6A illustrates a communication method for communicating with the user equipment UE, using the base station eNB or the base station NR; and is referred to as "single connectivity" in this embodiment for convenience. That is, the single connectivity is synonymous with a communication method using only one of LTE or New RAT.

Figure 6B:
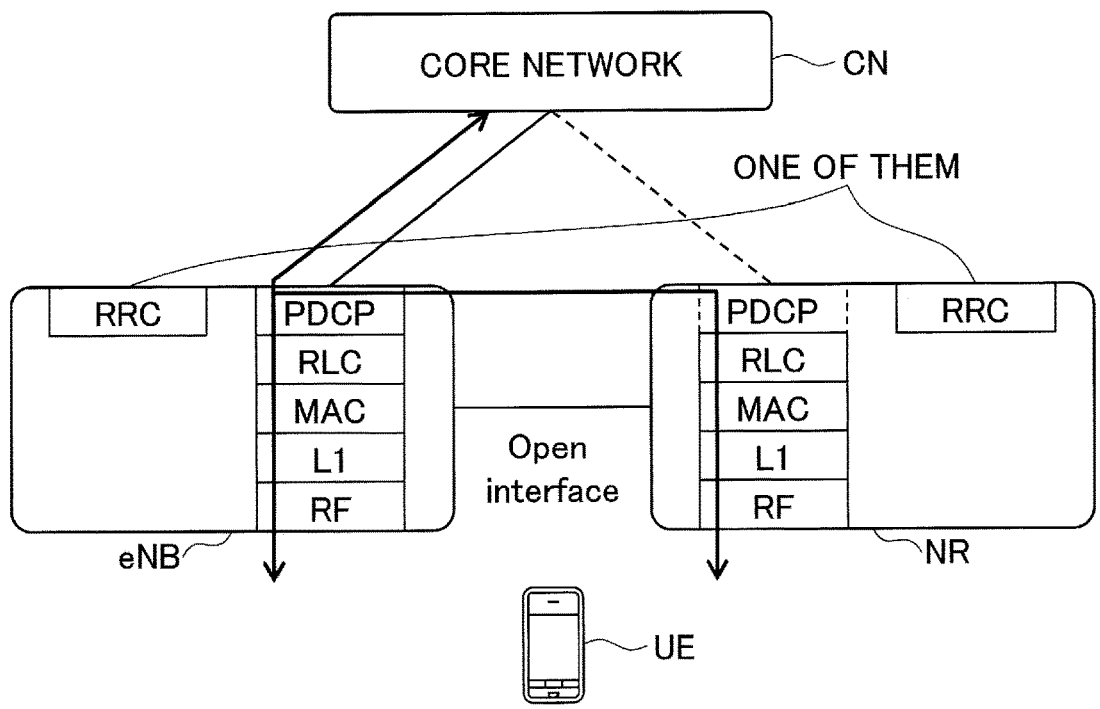
FIG. 6B is a diagram illustrating an outline of the operation of the radio communication system according to the embodiment.
Figure 6C:
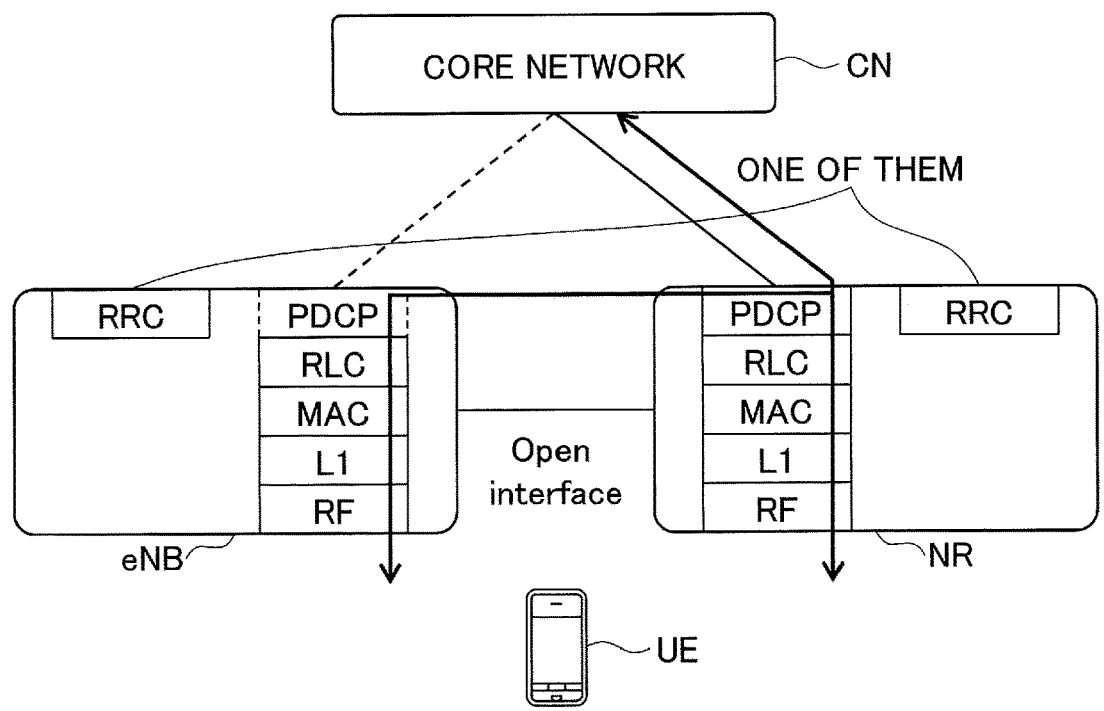
FIG. 6C is a diagram illustrating an outline of the operation of the radio communication system according to the embodiment.

FIGS. 6A and 6B illustrate a communication method (a communication method using a split bearer) for communicating with the user equipment UE, using both the base station eNB and the base station NR, and is referred to as "dual connectivity" in this embodiment for convenience. FIG. 6B illustrates a case in which the base station eNB performs PDCP processing (a PDCP anchor is configured in the base station eNB) and FIG. 6C illustrates a case in which the base station NR performs PDCP processing (a PDCP anchor is configured in the base station NR).

In this embodiment, the single connectivity (FIG. 6A), the dual connectivity (FIG. 6B) in which the base station eNB performs PDCP processing, and the dual connectivity (FIG. 6C) in which the base station NR performs PDCP processing can be voluntarily switched. In the LTE system according to the related art, the base station that performs the process of the RRC layer and the process of the PDCP layer in the split bearer is fixed to MeNB. However, in this embodiment, any one of the base station eNB and the base station NR can perform the process of the PDCP layer and the process of the RRC layer. As a result, in this embodiment, when the split bearer is used, it is possible to achieve flexible communication in which the base station NR that is assumed to have a higher processing performance than the base station eNB performs the process of the PDCP layer and the base station eNB with wide coverage manages an RRC connection.

<Procedure>

Next, the detailed procedure of the radio communication system according to this embodiment is described.

FIG. 7 is a diagram illustrating the change pattern of the communication method performed by the radio communication system. For example, in pattern 1, a communication method using the single connectivity of the base station eNB is changed to a communication method using the dual connectivity in which the base station eNB performs the process of the RRC layer and the base station NR performs the process of the PDCP layer. In pattern 2, a communication method using the single connectivity of the base station eNB is changed to a communication method using the dual connectivity in which the base station NR performs the process of the RRC layer and the process of the PDCP layer. In pattern 3, a communication method using the single connectivity of the base station NR is changed to a communication method using the dual connectivity in which the base station NR performs the process of the RRC layer and the process of the PDCP layer. In pattern 4, a communication method using the single connectivity of the base station NR is changed to a communication method using the dual connectivity in which the base station eNB performs the process of the RRC layer and the base station NR performs the process of the PDCP layer. In pattern 5, a communication method using the single connectivity of the base station NR is changed to a communication method using the dual connectivity in which the base station NR performs the process of the RRC layer and the base station eNB performs the process of the PDCP layer. In pattern 6, a communication method using the single connectivity of the base station NR is changed to a communication method using the dual connectivity in which the base station eNB performs the process of the RRC layer and the process of the PDCP layer. Next, a process sequence in each pattern is described.

Figure 8:
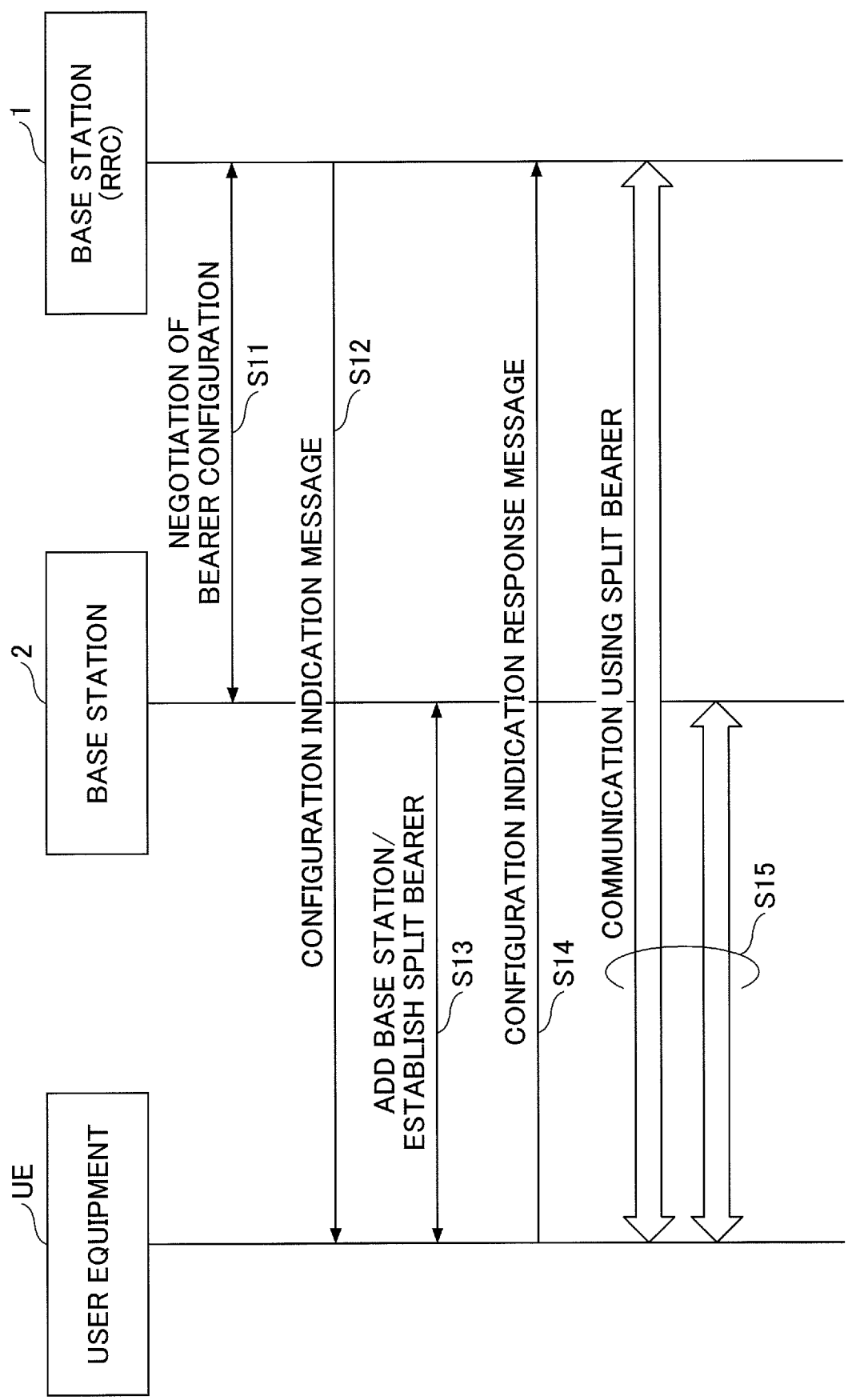
FIG. 8 is a sequence diagram illustrating an example of a procedure (there is no change in RRC) when the radio communication system changes the communication method.

FIG. 8 is a sequence diagram illustrating an example of a procedure (there is no change in RRC) when the radio communication system changes the communication method. The procedure illustrated in FIG. 8 corresponds to a case in which the base station that performs the process of the RRC layer is not changed when the communication method is changed, that is, a change pattern corresponding to patterns 1, 3, and 5 illustrated in FIG. 7. In FIG. 8, of two base stations that perform dual connectivity, a base station that performs the process of the RRC layer (a base station having an RRC connection established with the user equipment UE) is referred to as "base station 1" and the other base station is referred to as "base station 2". That is, in pattern 1, "base station 1" corresponds to the base station eNB and "base station 2" corresponds to the base station NR. In pattern 3, "base station 1" corresponds to the base station NR and "base station 2" corresponds to the base station eNB. In pattern 5, "base station 1" corresponds to the base station NR and "base station 2" corresponds to the base station eNB.

In Step S11, base station 1 negotiates the configuration of a bearer with base station 2 in order to change a communication method using a single connectivity to a communication method using dual connectivity (that is, in order to establish a split bearer with the user equipment UE). A message used for the negotiation is a message that is transmitted and received through the predetermined interface and corresponds to, for example, a message called SeNB Modification Request/SeNB Modification Request Acknowledge or SeNB Modification Required/SeNB Modification Confirm in LTE.

In Step S12, base station 1 transmits a configuration indication message to the user equipment UE in order to establish a split bearer between the user equipment UE and base stations 1 and 2. The configuration indication message includes a notice indicating that base station 2 is added as the base station used for communication and a notice indicating that a split bearer is to be established with the user equipment UE and base stations 1 and 2. In addition, the message may include a notice indicating the base station (the base station NR in pattern 1 and pattern 3 and the base station eNB in pattern 5) that performs the process of the PDCP layer. The configuration indication message may be an RRC layer message. The configuration indication message corresponds to an RRC connection reconfiguration message including a dedicated configuration (radio resource config dedicated) in LTE.

In Step S13, the user equipment UE adds base station 2 to a communication target base station and establishes a split bearer with base station 1 and base station 2. The process of adding base station 2 to the communication target base station means, for example, a process of performing a random access procedure to base station 2 to establish synchronization. Note that, in the procedure of step S13, transmission and reception of signaling messages are performed only with base station 2; however, transmission and reception of signaling messages may be performed with base station 1. The procedure performed in Step S13 may also be called, for example, a base station addition procedure (node addition procedure) and a split bearer setup/change procedure (split bearer setup/modification procedure).

In Step S14, the user equipment UE transmits a configuration indication response message to base station 1 in order to notify base station 1 that the establishment of a split bearer has been completed. The configuration indication response message may be an RRC layer message. The message corresponds to an RRC Connection Reconfiguration Complete message in LTE.

In Step S15, the communication between base stations 1 and 2 and the user equipment UE using the split bearer is performed. In pattern 1 and pattern 3 illustrated in FIG. 7, the base station NR performs the process of the PDCP layer and each of the base station NR and the base station eNB performs the process of a layer lower than the PDCP layer. In pattern 5, the base station eNB performs the process of the PDCP layer and each of the base station NR and the base station eNB performs the process of a layer lower than the PDCP layer. The user equipment UE performs the common process of the PDCP layer and separately performs the process of a lower layer corresponding to the base station eNB and the process of a lower layer corresponding to the base station NR as the process of the lower layer.

Figure 9:
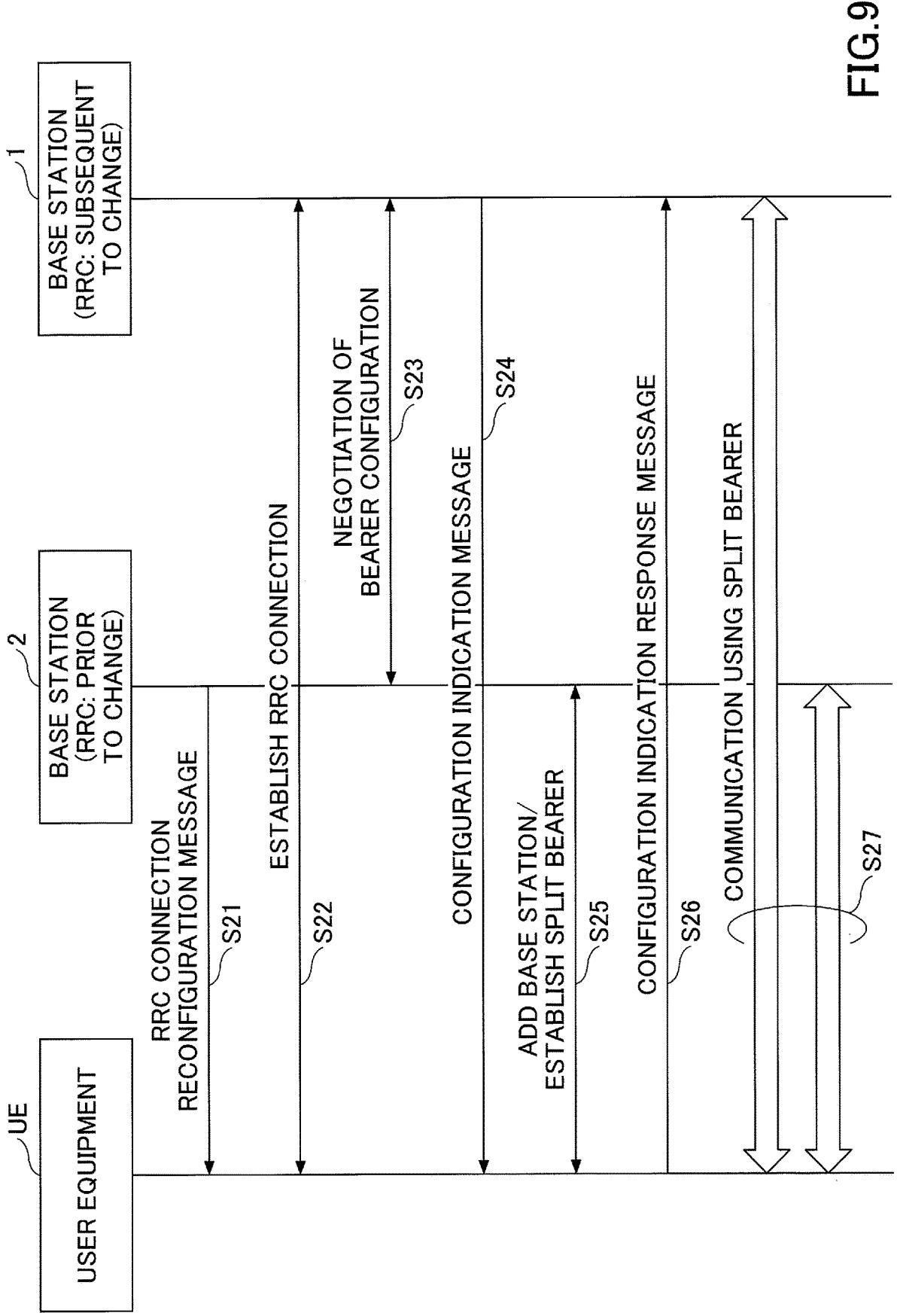
FIG. 9 is a sequence diagram illustrating an example of a procedure (there is a change in RRC) when the radio communication system changes the communication method.

FIG. 9 is a sequence diagram illustrating an example of a procedure (a change in RRC) when the radio communication system changes the communication method. The procedure illustrated in FIG. 9 corresponds to a case in which the base station that performs the process of the RRC layer is changed when the communication method is changed, that is, a change pattern corresponding to patterns 2, 4, and 6 illustrated in FIG. 7. In FIG. 9, of two base stations that perform dual connectivity, a base station that performs the process of the RRC layer prior to a change is referred to as "base station 1" and a base station that performs the process of the RRC layer subsequent to the change is referred to as "base station 2". That is, in pattern 2 illustrated in FIG. 7, "base station 1" corresponds to the base station eNB and "base station 2" corresponds to the base station NR. In pattern 4, "base station 1" corresponds to the base station NR and "base station 2" corresponds to the base station eNB. In pattern 6, "base station 1" corresponds to the base station NR and "base station 2" corresponds to the base station eNB.

In Step S21, base station 2 transmits an RRC connection reconfiguration message to the user equipment UE in order to indicate the user equipment UE to change the base station that performs the process of the RRC layer to base station 1. The message corresponds to an RRC Connection Reconfiguration message in LTE. For example, a handover procedure may be used as the procedure in Step S21. In the handover procedure in LTE, an RRC Connection Reconfiguration message including mobility info is used.

In Step S22, the user equipment UE establishes an RRC connection with the base station 1.

Since the procedures in Steps S23 to S26 are the same as those in Steps S11 to S14 illustrated in FIG. 8, the descriptions are omitted.

In Step S27, the communication between base stations 1 and 2 and the user equipment UE using the split bearer is performed. In pattern 2 and pattern 4 illustrated in FIG. 7, the base station NR performs the process of the PDCP layer and each of the base station NR and the base station eNB performs the process of a layer lower than the PDCP layer. In pattern 6, the base station eNB performs the process of the PDCP layer and each of the base station NR and the base station eNB performs the process of a layer lower than the PDCP layer.

The process sequence in each pattern is described above. However, the process sequence is merely an example, and the process sequence is not limited to this. For example, the procedure in Step S13 and the procedure in Step S14 illustrated in FIG. 8 may be reversed or the procedure in Step S14 may be omitted. Similarly, the procedure in Step S25 and the procedure in Step S26 illustrated in FIG. 9 may be reversed or the procedure in Step S26 may be omitted. In addition, the procedure in Step S21 and the procedure in Step S24 illustrated in FIG. 9 may be performed at the same time. For example, the RRC connection reconfiguration message may include the configuration indication message. In this case, the procedure in Step S26 may be omitted.

In each of the above-mentioned patterns, an example is described in which the communication method is changed from the single connectivity to the dual connectivity. The procedures illustrated in FIGS. 8 and 9 can also be applied to a case in which the communication method is changed from the dual connectivity to the single connectivity and a case in which the communication method is changed between the dual connectivity and the dual connectivity. For example, when the communication method is changed from the dual connectivity to the single connectivity, the base station (the base station eNB/the base station NR) that has established an RRC connection may indicate the user equipment UE to change the bearer from the split bearer to a normal bearer, using the procedure in Step S12 illustrated in FIG. 7. When receiving the indication, the user equipment UE ends communication with the base station (the base station eNB/the base station NR), with which an RRC connection has not been established, to change the bearer from the split bearer to the normal bearer.

For example, when the communication method is changed between the dual connectivity and the dual connectivity, the base station (the base station eNB/the base station NR) that has established an RRC connection may indicate the user equipment UE to change the base station that performs the process of the PDCP layer in the split bearer, using the procedure in Step S12 illustrated in FIG. 7. When receiving the indication, the user equipment UE can recognize that the base station which performs the process of the PDCP layer in the split bearer has been changed.

(Separation of UL/DL)

In the above-described dual connectivity, it can be separately configured for downlink (DL) and uplink (UL) as to whether the single connectivity or the dual connectivity is to be applied, and as to the base station that is to perform the process of the PDCP layer when the dual connectivity is applied. For example, in pattern 1 illustrated in FIG. 7, the base station NR may perform the process of the PDCP layer while the dual connectivity is applied only to DL; and the process is performed for UL while maintaining the single connectivity. In this case, the base station eNB continuously performs the process of the PDCP layer for UL. Therefore, it is possible to continuously perform communication, without instantaneously interrupting UL communication.

(Process of PDCP Layer in C-Plane)

In the dual connectivity, when the process of the PDCP layer and the process of the RRC layer are performed by different base stations, the base station that performs the process of the RRC layer may transmit and receive a C-plane message including an RRC message through the base station that performs the process of the PDCP layer or through its own PDCP layer.

In the latter case, even if only the base station that performs the process of the PDCP layer is changed as in patterns 1, 3, and 5 illustrated in FIG. 7, the base station eNB or the base station NR continuously uses its own PDCP layer to transmit and receive an RRC message. Accordingly, it is possible to transmit and receive the RRC message, without instantaneous interruption.

In the former case, when only the base station that performs the process of the PDCP layer is changed as in patterns 1, 3, and 5 illustrated in FIG. 7, the transmission and reception of the RRC message are likely to be instantaneously interrupted. For example, in FIG. 8, at the time at which the configuration indication message is transmitted in Step S12, the configuration indication message is transmitted through the PDCP layer of base station 1. At the time at which the configuration indication response message is received in Step S14, the configuration indication response message is received through the PDCP layer of base station 2. The procedure illustrated in FIG. 8 is just an example. If a plurality of RRC messages are transmitted and received in the procedures in Step S12 and Step S14, it is highly likely that the transmission and reception of the RRC message are instantaneously interrupted. In a case in which the communication method is changed from the single connectivity to the dual connectivity, when the base station that performs the process of the RRC layer is not changed and only the base station that performs the process of the PDCP layer is changed, the C-plane message including the RRC message may be transmitted and received through the base station that performs the process of the PDCP layer until the transmission and reception of the RRC message are completed (or until a change in the PDCP layer is completed).

<Functional Configuration>

An example of the functional configurations of the user equipment UE and the base station eNB for performing the operations according to the plurality of embodiments are described.

(User Equipment)

Figure 10:
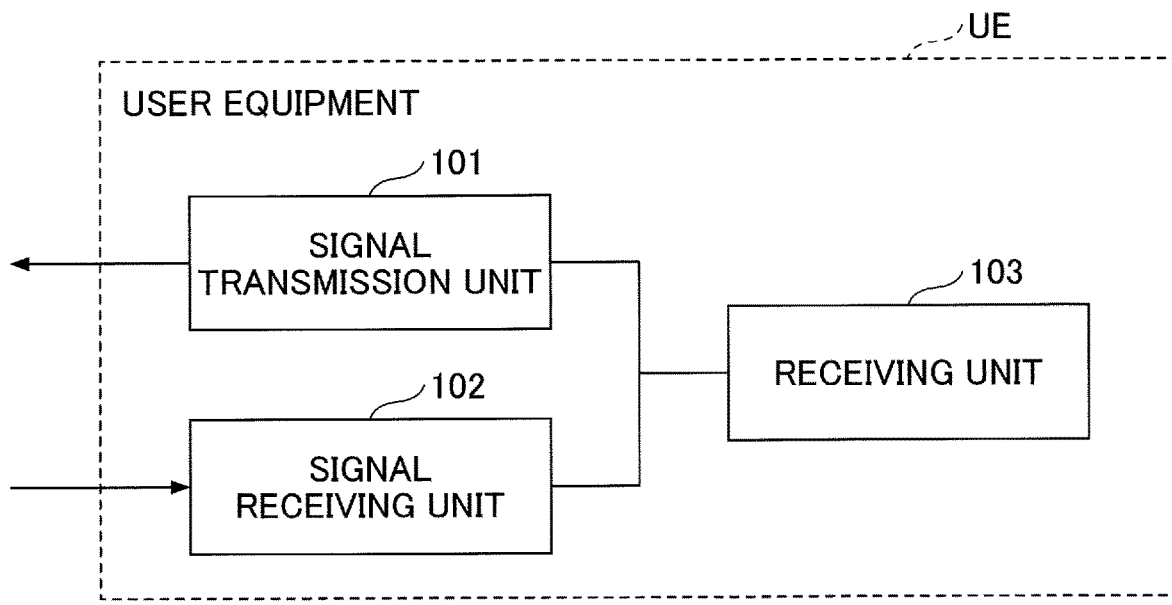
FIG. 10 is a diagram illustrating an example of the functional configuration of user equipment according to the embodiment.

FIG. 10 is a diagram illustrating an example of the functional configuration of the user equipment according to the embodiment. As illustrated in FIG. 10, the user equipment UE includes a signal transmission unit 101, a signal receiving unit 102, and a receiving unit 103. FIG. 10 illustrates only the functional units of the user equipment UE which are particularly related to the embodiment of the invention and the user equipment UE also includes at least a function, which is not depicted, for performing the operation conforming to LTE (including 5G). The functional configuration illustrated in FIG. 10 is merely an example. Functional division and the names of the functional units may any division and names, provided that the operation according to the embodiment can be executed.

The signal transmission unit 101 has a function of generating various signals in a physical layer from signals in a higher layer which are to be transmitted from the user equipment UE; and wirelessly transmitting the generated signals. The signal receiving unit 102 has a function of wirelessly receiving various signals and retrieving signals in a higher layer from the received signals in a physical layer. In addition, the signal transmission unit 101 and the signal receiving unit 102 have a function of communicating with the base station eNB and the base station NR, using a split bearer.

The receiving unit 103 has a function of receiving a configuration indication message indicating the establishment of a split bearer with the base station eNB or the base station NR from the base station eNB or the base station NR with which an RRC connection has been established. In addition, the receiving unit 103 has a function of receiving an RRC connection reconfiguration message indicating the change of an RRC connection to another base station (the base station NR or the base station eNB) from the base station eNB or the base station NR with which the RRC connection has been established.

(Base Station)

Figure 11:
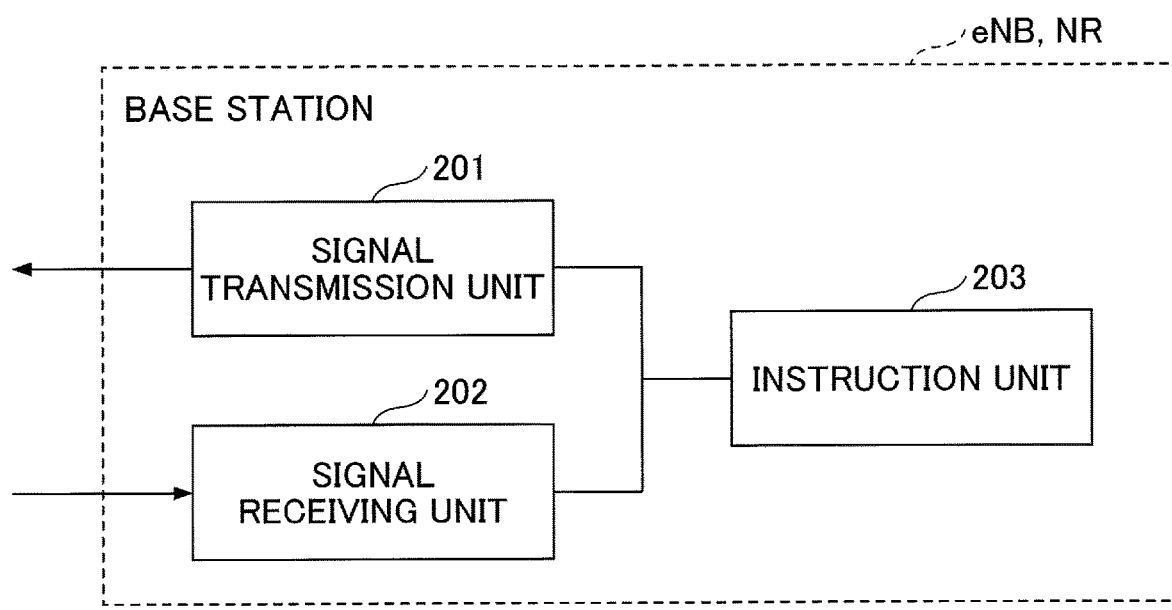
FIG. 11 is a diagram illustrating an example of the functional configuration of a base station according to the embodiment.

FIG. 11 is a diagram illustrating an example of the functional configuration of the base station according to the embodiment. The functional configuration illustrated in FIG. 11 is common to the base station eNB and the base station NR. As illustrated in FIG. 11, the base station eNB/the base station NR include a signal transmission unit 201, a signal receiving unit 202, and an instruction unit 203. FIG. 11 illustrates only the functional units of the base station eNB/the base station NR which are particularly related to the embodiment of the invention and the base station eNB/the base station NR also include at least a function (not illustrated) for performing the operation conforming to LTE (including 5G). The functional configuration illustrated in FIG. 11 is merely an example. Functional division and names of the functional units may be any division and names, provided that the operation according to the embodiment can be executed.

The signal transmission unit 201 has a function of generating various signals in a physical layer from signals in a higher layer which are to be transmitted from the base station eNB/the base station NR; and wirelessly transmitting the generated signals. The signal receiving unit 202 has a function of wirelessly receiving various signals from the user equipment UE and retrieving signals in a higher layer from the received signals in a physical layer. The signal transmission unit 201 and the signal receiving unit 202 include a function of performing the processes of a physical layer, a MAC layer, an RLC layer, a PDCP layer, and an RRC layer.

In addition, the signal transmission unit 201 and the signal receiving unit 202 have a function of transmitting and receiving downlink data after the process of the PDCP layer is performed or uplink data after the process of the RLC layer is performed to and from another base station (the base station eNB/the base station NR) through a predetermined interface when a split bearer is established between the host base station and the user equipment UE and the host base station performs the process of the PDCP layer. The signal transmission unit 201 and the signal receiving unit 202 also has a function of transmitting and receiving downlink data after the process of the PDCP layer is performed or uplink data after the process of the RLC layer is performed to and from another base station (the base station eNB/the base station NR) through a predetermined interface when a split bearer is established between the host base station and the user equipment UE and the host base station does not perform the process of the PDCP layer.

The instruction unit 203 has a function of transmitting, to the user equipment UE, a configuration indication message indicating the establishment of a split bearer with the base station eNB or the base station NR. In addition, the instruction unit 203 has a function of transmitting, to the user equipment UE, an RRC connection reconfiguration message indicating the change of an RRC connection to another base station (the base station eNB/the base station NR). The instruction unit 203 also has a function of determining to switch to one communication method with the user equipment, between the communication method using the single connectivity and the communication method using the dual connectivity, and a function of negotiating a bearer configuration with the other base station (the base station eNB/the base station NR), in order to perform switching of the communication method.

The entire functional configuration of each of the user equipment UE and the base station eNB may be implemented by a hardware circuit (for example, one or a plurality of IC chips). Alternatively, a portion of the functional configuration may be implemented by a hardware circuit and the other portion of the functional configuration may be implemented by a CPU and a program.

(User Equipment)

Figure 12:
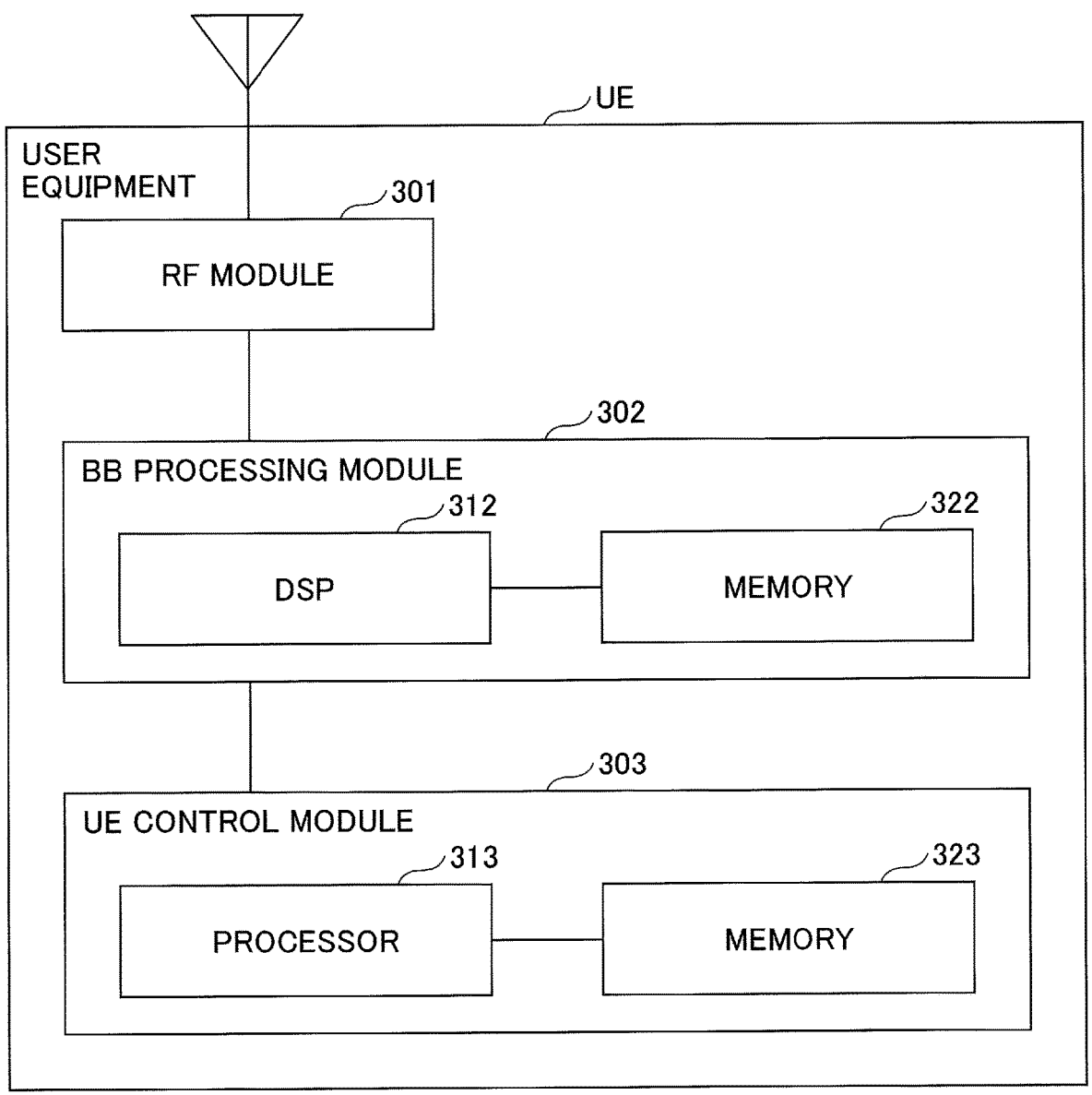
FIG. 12 is a diagram illustrating an example of the hardware configuration of the user equipment according to the embodiment.

FIG. 12 is a diagram illustrating an example of the hardware configuration of the user equipment according to the embodiment. FIG. 12 illustrates a configuration that is closer to an implementation example than that illustrated in FIG. 10. As illustrated in FIG. 12, the user equipment UE includes a radio frequency (RF) module 301 that performs a process related to radio signals, a base band (BB) processing module 302 that processes base band signals, and a UE control module 303 that performs, for example, the higher layer processing.

The RF module 301 performs, for example, digital-to-analog (D/A) conversion, modulation, frequency conversion, and power amplification for the digital base band signal received from the BB processing module 302 to generate a radio signal to be transmitted from an antenna. In addition, the RF module 301 performs, for example, frequency conversion, analog-to-digital (A/D) conversion, and demodulation for a received radio signal to generate a digital base band signal and transmits the digital base band signal to the BB processing module 302. The RF module 301 includes, for example, a portion of the signal transmission unit 101 and the signal receiving unit 102 illustrated in FIG. 10.

The BB processing module 302 performs a conversion process between an IP packet and a digital base band signal. A digital signal processor (DSP) 312 is a processor that performs signal processing in the BB processing module 302. A memory 322 is used as a work area of the DSP 312. The BB processing module 302 includes, for example, a portion of the signal transmission unit 101 and a portion of the signal receiving unit 102 illustrated in FIG. 10.

The UE control module 303 performs, for example, IP layer protocol processing and various kinds of application processing. A processor 313 performs the processes performed by the UE control module 303. A memory 323 is used as a work area of the processor 313. The UE control module 303 may include the receiving unit 103 illustrated in FIG. 10.

(Base Station)

Figure 13:
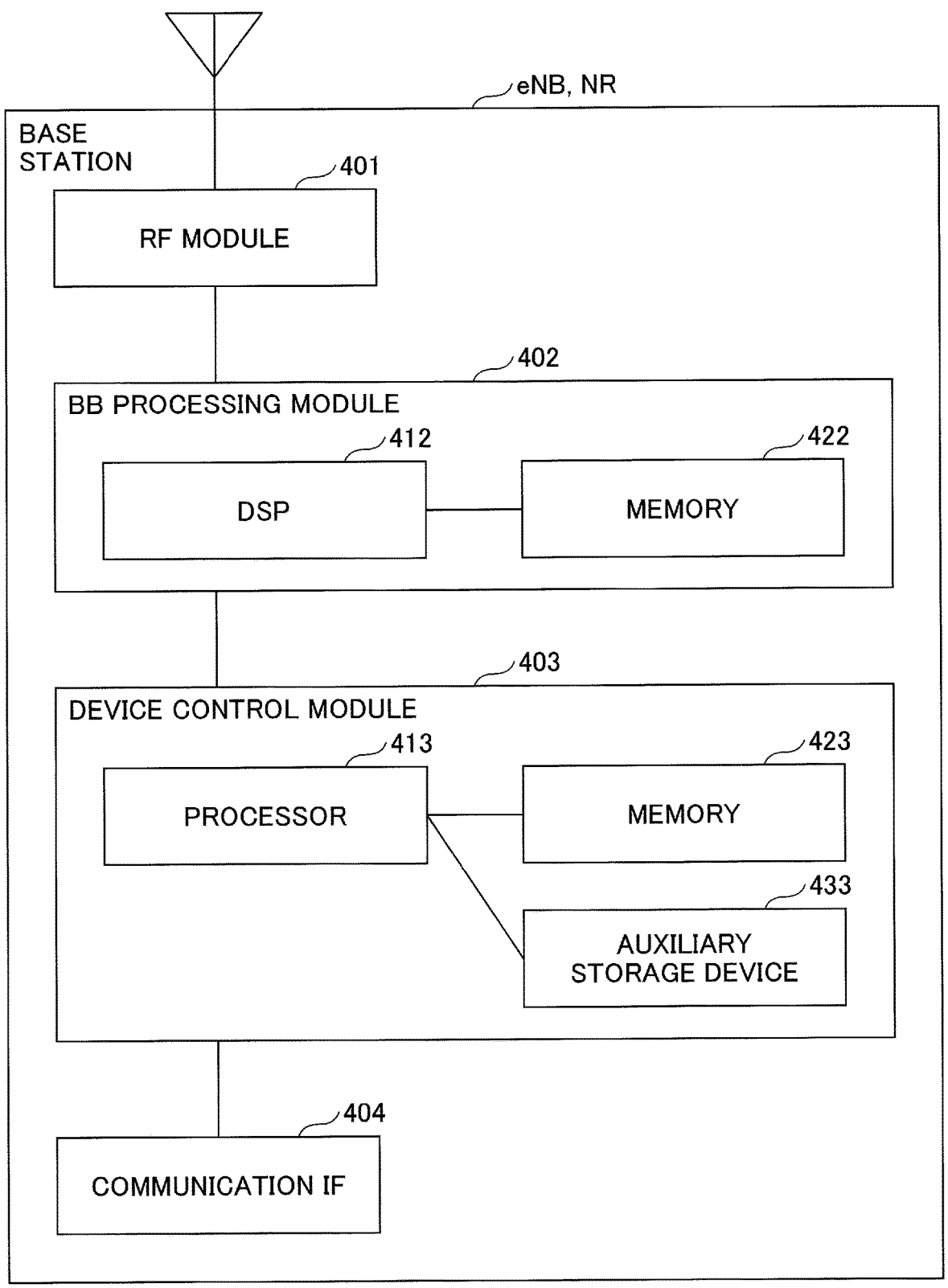
FIG. 13 is a diagram illustrating an example of the hardware configuration of the base station according to the embodiment.

FIG. 13 is a diagram illustrating an example of the hardware configuration of the base station according to the embodiment. FIG. 13 illustrates a configuration that is closer to an implementation example than that illustrated in FIG. 11. As illustrated in FIG. 13, the base station eNB/the base station NR include an RF module 401 that performs a process related to radio signals, a BB processing module 402 that processes base band signals, a device control module 403 that processes, for example, a higher layer, and a communication IF 404 that is an interface for connection to the network.

The RF module 401 performs, for example, D/A conversion, modulation, frequency conversion, and power amplification for the digital base band signal received from the BB processing module 402 to generate a radio signal to be transmitted from an antenna. In addition, the RF module 401 performs, for example, frequency conversion, A/D conversion, and demodulation for a received radio signal to generate a digital base band signal and transmits the digital base band signal to the BB processing module 402. The RF module 401 includes, for example, a portion of the signal transmission unit 201 and the signal receiving unit 202 illustrated in FIG. 11.

The BB processing module 402 performs a conversion process between an IP packet and a digital base band signal. A DSP 412 is a processor that performs signal processing in the BB processing module 402. A memory 422 is used as a work area of the DSP 412. The BB processing module 402 includes, for example, a portion of the signal transmission unit 201 and a portion of the signal receiving unit 202 illustrated in FIG. 11.

The device control module 403 performs, for example, IP layer protocol processing and an operation and maintenance (OAM) process. A processor 413 performs the processes performed by the device control module 403. A memory 423 is used as a work area of the processor 413. An auxiliary storage device 433 is, for example, an HDD and stores various kinds of configuration information used for the operation of the base station eNB/the base station NR. The device control module 403 may include, for example, the instruction unit 203 illustrated in FIG. 11.

CONCLUSION

As described above, according to the embodiment, there is provided user equipment for communicating with a first base station and a second base station, the user equipment including a receiver that receives, form the first base station or the second base station with which an RRC connection is established, a first message indicating to establish a split bearer between the first base station and the second base station; and a communicator that establishes the split bearer between the first base station and the second base station that are reported by the first message, wherein, in the split bearer, a process of a PDCP layer is performed by one of the first base station and the second base station. According to this user equipment UE, there is provided a technique that allows to voluntarily switch, when the communication using the split bearer is performed, the base station that performs the process of the PDCP layer.

Further, the receiver may receive, from the first base station or the second base station with which the RRC connection is established, a second message indicating to switch the RRC connection to the other base station, and the communicator may establish the RRC connection with the first base station or the second base station indicated by the second message, and, upon receiving, by the receiver, the first message from the first base station or the second base station with which the RRC connection is established, the communicator may establish the split bearer between the first base station and the second base station reported by the first message. As a result, the process of the RRC layer can be performed by any base station, regardless of whether the base station performs the process of the PDCP layer in the split bearer.

Further, the first base station may support LTE and the first base station establishes the RRC connection with the user equipment, the second base station may support 5G, the receiver may receive the first message from the first base station, and, in the split bearer, the process of the PDCP layer may be performed by the second base station. As a result, when the split bearer is used, flexible communication can be achieved such that, while the 5G base station, which is expected to have higher processing performance than that of the LTE base station, performs the process of the PDCP layer, the LTE base station, which has wide coverage, performs RRC connection management.

Furthermore, according to the embodiment, there is provided a communication method executed by user equipment for communicating with a first base station and a second base station, the communication method including steps of receiving, form the first base station or the second base station with which an RRC connection is established, a first message indicating to establish a split bearer between the first base station and the second base station; and establishing the split bearer between the first base station and the second base station that are reported by the first message, wherein, in the split bearer, a process of a PDCP layer is performed by one of the first base station and the second base station. According to this communication method, there is provided a technique that allows to voluntarily switch, when the communication using the split bearer is performed, the base station that performs the process of the PDCP layer.

Additional Embodiment

The configuration of each device (the user equipment UE/the base station eNB/the base station NR) described in the embodiment of the invention may be implemented by the execution of a program by the CPU (processor) in the device including the CPU and the memory, may be implemented by hardware, such as a hardware circuit including a logic for the processes described in this embodiment, or may be implemented by a combination of the program and the hardware.

The embodiment of the invention is described above. However, the disclosed invention is not limited to the embodiment and it will be appreciated by those skilled in the art that various variations, modifications, alterations, and substitutions can be made. Specific numerical examples are used to facilitate the understanding of the invention. However, the numerical values are merely examples and any appropriate values may be used, unless specified as otherwise. The classification of the items in the above-mentioned description is not essential in the invention and matters described in two or more items may be combined and used, if necessary. Matters described in an item may be applied to matters described in another item (as long as they do not contradict each other). The boundaries between the functional units or the processing units in the functional block diagram do not necessarily correspond to the boundaries between physical components. The operation of a plurality of functional units may be physically performed by one component. Alternatively, the operation of one functional unit may be physically performed by a plurality of components. In the sequences and the flowcharts described in the embodiment, the order of the processes may be changed as long as there is no contradiction between the processes. For convenience of explanation of the processes, the user equipment UE/the base station eNB/the base station NR are described, using the functional block diagrams. However, the devices may be implemented by hardware, software, or a combination thereof. The software that is operated by the processor included in the user equipment UE according to the embodiment of the invention, the software that is operated by the processor included in the base station eNB according to the embodiment of the invention, and the software that is operated by the processor included in the base station NR according to the embodiment of the invention may be stored in a random access memory (RAM), a flash memory, a read only memory (ROM), an EPROM, an EEPROM, a register, a hard disk (HDD), a removable disk, a CD-ROM, a database, a server, and other proper storage media.

Notification of information is not limited the aspect/embodiment described in the present specification any may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

The decision or determination may be performed by a value (0 or 1) represented by one bit; may be performed by a Boolean value (Boolean: true or false); or by numerical value comparison (e.g., a comparison with a predetermined value).

Note that the terms described in this specification and/or terms required for understanding the specification may be replaced with terms having the same or similar meanings. For example, a channel and/or a symbol may be a signal (signal). Furthermore, a signal may be a message.

The UE may be referred to, by a person skilled in the art, as a subscriber station; a mobile unit; a subscriber unit; a wireless unit; a remote unit; a mobile device; a wireless device; a wireless communication device; a remote device; a mobile subscriber station; an access terminal; a mobile terminal; a wireless terminal; a remote terminal; a handset; a user agent; a mobile client; a client; or some other suitable terms.

The each aspect/embodiment described in the specification may be used alone; may be used in combination; or may be used by switching depending on execution. Furthermore, reporting of predetermined information (e.g., reporting of "being X") is not limited to the method of explicitly performing, and may be performed implicitly (e.g., not perform reporting of the predetermined information).

The terms "determine (determining)" and "decide (determining)" may encompass a wide variety of operations. The "determine" and "decide" may include, for example, "determine" and "decide" what is calculated (calculating), computed (computing), processed (processing), derived (deriving), investigated (investigating), looked up (looking up) (e.g., looked up in tables, databases, or other data structures), ascertained (ascertaining). Furthermore, the "determine" and "decide" may include deeming that "determination" and "decision" are made on reception (receiving) (e.g., receiving information), transmission (transmitting) (e.g., transmitting information), input (input), output (output), and access (accessing) (e.g., accessing data in a memory). Furthermore, the "determine" and "decide" may include deeming that "determination" and "decision" are made on what is resolved (resolving), selected (selecting), chosen (choosing), established (establishing), and compared (comparing). Namely, the "determine" and "decide" may include deeming that some operation is "determined" or "decided."

The phrase "based on" used in this specification does not imply "based only on" unless explicitly stated otherwise. In other words, the phrase "based on" implies both "based only on" and "based at least on."

Furthermore, the order of the processing procedures, sequences, and so forth of the aspects/embodiments described in the specification may be re-arranged, provided that they do not contradict. For example, for the methods described in the specification, the elements of various steps are presented in an exemplary order, and are not limited to the specific order presented.

The input/output information, etc., may be stored in a specific location (e.g., a memory), or managed in a management table. The input/output information, etc., may be overwritten, updated, or additionally written. The output information, etc., may be deleted. The input information, etc., may be transmitted to another device.

Reporting of predetermined information (e.g., reporting of "being X") is not limited to the method of explicitly performing, and may be implicitly performed (e.g., reporting of the predetermined information is not performed).

The information signals, etc., described in the specification may be represented by using any of a variety of different techniques. For example, the data, indication, command, information, signal, bit, symbol, chip, etc., may be represented by a voltage, an electric current, an electromagnetic wave, a magnetic field or magnetic particles, a light field or photons, or any combination thereof.

The configuration indication message is an example of a first message. The RRC connection reconfiguration message is an example of a second message. The base station eNB or the base station NR is an example of a first base station. The base station eNB or the base station NR is an example of a second base station.

The present international application is based on and claims priority to Japanese Patent Application No. 2016-078504 filed on Apr. 8, 2016 and the entire content of Japanese Patent Application No. 2016-078504 is incorporated herein by reference.

LIST OF REFERENCE SYMBOLS

UE USER EQUIPMENT
eNB BASE STATION
NR BASE STATION
CN CORE NETWORK
101 SIGNAL TRANSMISSION UNIT
102 SIGNAL RECEIVING UNIT
103 RECEIVING UNIT
201 SIGNAL TRANSMISSION UNIT
202 SIGNAL RECEIVING UNIT
203 INSTRUCTION UNIT
301 RF MODULE
302 BB PROCESSING MODULE
303 UE CONTROL MODULE
304 COMMUNICATION IF
401 RF MODULE
402 BB PROCESSING MODULE
403 DEVICE CONTROL MODULE

The invention claimed is:

1. User equipment for communicating with a first base station and a second base station, the user equipment comprising:
   a receiver that receives, from the first base station or the second base station with which a Radio Resource Control (RRC) connection is established, a first message indicating to establish a split bearer between the first base station and the second base station; and
   a communicator that establishes the split bearer between the first base station and the second base station that are reported by the first message,
   wherein the first base station or the second base station supports New Radio (NR).

2. The user equipment according to claim 1, wherein the receiver receives, from the first base station or the second base station with which the RRC connection is established, a second message indicating to switch the RRC connection to the other base station, and
   wherein the communicator establishes the RRC connection with the first base station or the second base station indicated by the second message, and, upon receiving, by the receiver, the first message from the first base station or the second base station with which the RRC connection is established, the communicator establishes the split bearer between the first base station and the second base station.

3. The user equipment according to claim 1, wherein the first base station supports Long-Term Evolution (LTE) and the first base station establishes the RRC connection with the user equipment,
   wherein the second base station supports the NR, and
   wherein the receiver receives the first message from the first base station.

4. A communication method executed by user equipment for communicating with a first base station and a second base station, the communication method comprising:
   receiving, from the first base station or the second base station with which a Radio Resource Control (RRC) connection is established, a first message indicating to establish a split bearer between the first base station and the second base station; and
   establishing the split bearer between the first base station and the second base station that are reported by the first message,
   wherein the first base station or the second base station supports New Radio (NR).

* * * * *